(12) United States Patent
Campbell

(10) Patent No.: US 11,492,116 B2
(45) Date of Patent: Nov. 8, 2022

(54) TILTROTOR AIRCRAFT HAVING TILTABLE FORWARD AND AFT ROTORS

(71) Applicant: Textron Innovations Inc., Providence, RI (US)

(72) Inventor: Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/545,158

(22) Filed: Dec. 8, 2021

(65) Prior Publication Data

US 2022/0258863 A1    Aug. 18, 2022

Related U.S. Application Data

(63) Continuation of application No. 16/750,269, filed on Jan. 23, 2020, now Pat. No. 11,198,509, which is a continuation of application No. 15/724,669, filed on Oct. 4, 2017, now Pat. No. 10,618,656.

(51) Int. Cl.
| | | |
|---|---|---|
| *B64C 29/00* | (2006.01) | |
| *B64D 1/02* | (2006.01) | |
| *B64D 37/12* | (2006.01) | |
| *B64D 25/12* | (2006.01) | |

(52) U.S. Cl.
CPC ............ *B64D 1/02* (2013.01); *B64C 29/0033* (2013.01); *B64C 2201/128* (2013.01); *B64D 25/12* (2013.01); *B64D 37/12* (2013.01)

(58) Field of Classification Search
CPC .......... B64D 1/02; B64D 25/12; B64D 37/12; B64C 29/0033; B64C 2201/128; B64C 27/22; B64C 19/00
See application file for complete search history.

(56) References Cited

U.S. PATENT DOCUMENTS

| | | | |
|---|---|---|---|
| 3,081,964 | A | 3/1963 | Quenzler |
| 6,655,631 | B2 | 12/2003 | Austen-Brown |
| 7,959,104 | B2 | 6/2011 | Kuntz |
| 9,643,720 | B2 | 5/2017 | Hesselbarth |
| 9,821,909 | B2 | 11/2017 | Moshe |
| 10,315,761 | B2 | 6/2019 | McCullough et al. |

(Continued)

FOREIGN PATENT DOCUMENTS

| | | |
|---|---|---|
| AU | 532184 B2 | 9/1983 |
| CN | 103587683 A | 2/2014 |

(Continued)

*Primary Examiner* — Valentina Xavier
(74) *Attorney, Agent, or Firm* — Lawrence Youst PLLC

(57) ABSTRACT

A tiltrotor aircraft has a vertical takeoff and landing flight mode and a forward flight mode. The aircraft includes an airframe having at least one wing. First and second oppositely disposed booms extend longitudinally from the at least one wing. Forward rotors are coupled to the forward ends of the booms and aft rotors are coupled to the aft ends of the booms. The forward rotors are reversibly tiltable between a vertical lift orientation, wherein the forward rotors are above the booms, and a forward thrust orientation, wherein the forward rotors are forward of the booms. The aft rotors are reversibly tiltable between a vertical lift orientation, wherein the aft rotors are below the booms, and a forward thrust orientation, wherein the aft rotors are aft of the booms.

20 Claims, 13 Drawing Sheets

(56) References Cited

U.S. PATENT DOCUMENTS

| | | |
|---|---|---|
| 10,351,235 B2 | 7/2019 | Karem et al. |
| 10,513,329 B2 | 12/2019 | Ou |
| 2010/0171001 A1 | 7/2010 | Karem |
| 2011/0001020 A1 | 1/2011 | Forgac |
| 2015/0136897 A1 | 5/2015 | Seibel et al. |
| 2015/0266571 A1 | 9/2015 | Bevirt et al. |
| 2016/0137298 A1 | 5/2016 | Youngblood |
| 2017/0240274 A1 | 8/2017 | Regev |
| 2021/0206487 A1* | 7/2021 | Iqbal ................ B64C 29/0083 |
| 2021/0362849 A1* | 11/2021 | Bower ................ B64C 27/28 |
| 2022/0009626 A1* | 1/2022 | Baharav ................ B64C 39/04 |
| 2022/0119102 A1* | 4/2022 | Shaanan ................ B64C 27/59 |
| 2022/0177109 A1* | 6/2022 | Hefner ................ B64C 1/068 |
| 2022/0234747 A1* | 7/2022 | Bower ................ B64C 29/0033 |

FOREIGN PATENT DOCUMENTS

| | | |
|---|---|---|
| CN | 205440867 U | 8/2016 |
| DE | 102014000509 A1 | 7/2015 |
| WO | 2013178776 A1 | 12/2013 |
| WO | 2014058351 A2 | 4/2014 |
| WO | 2018203036 A1 | 11/2018 |
| WO | 2019034765 A1 | 2/2019 |

\* cited by examiner

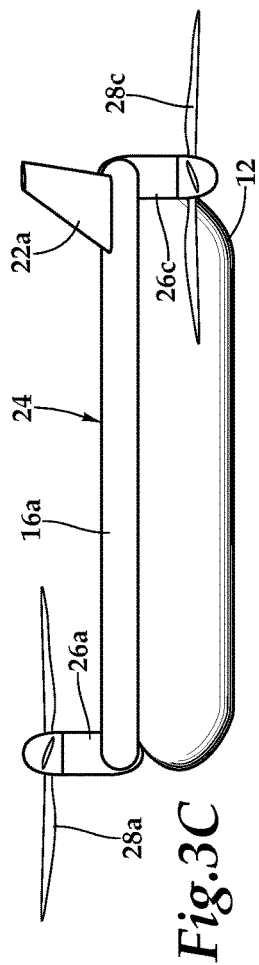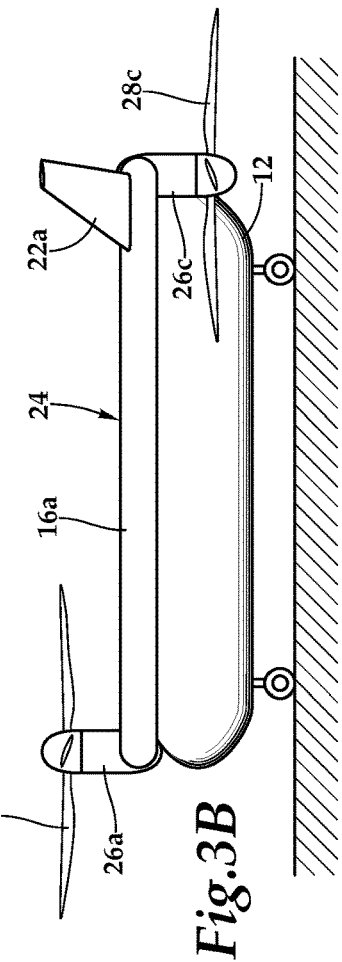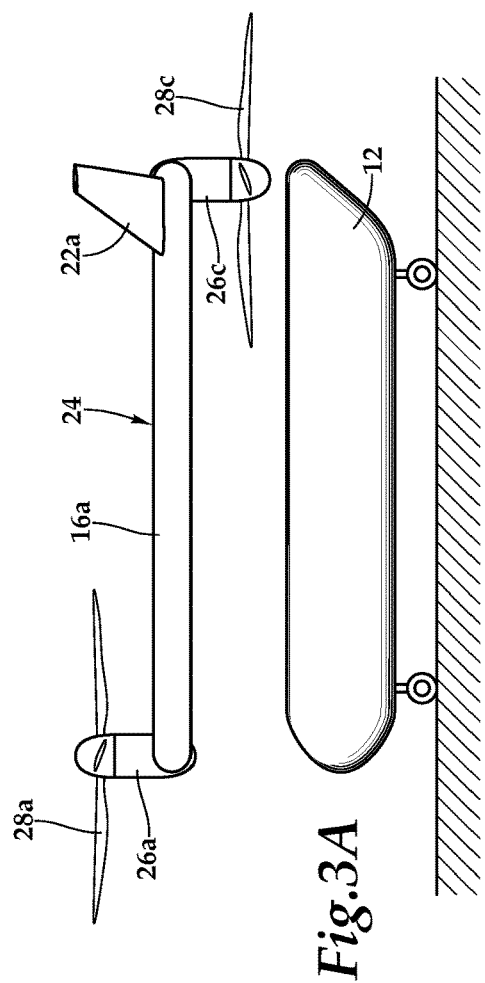

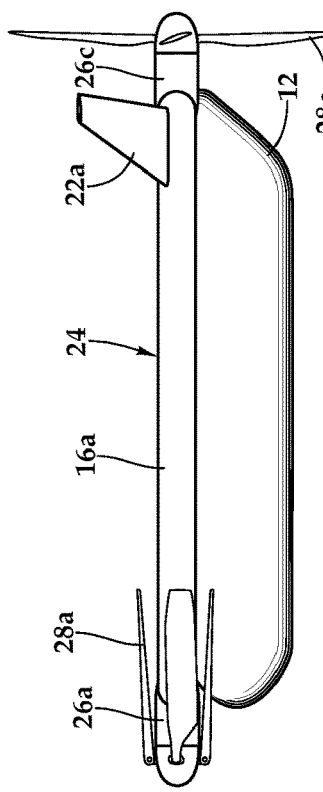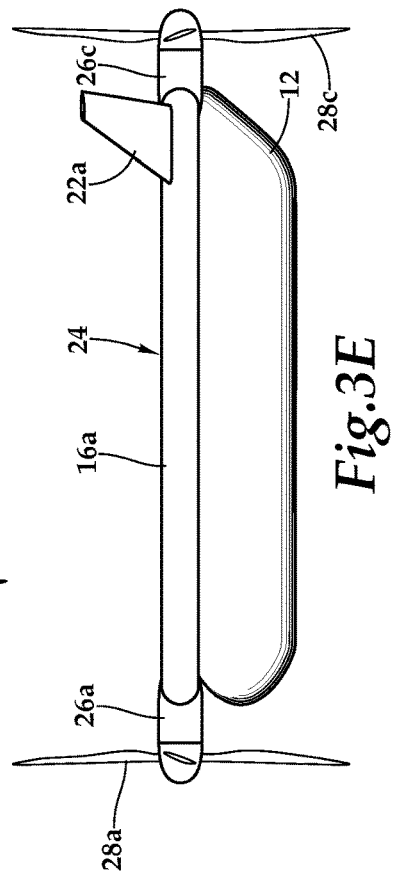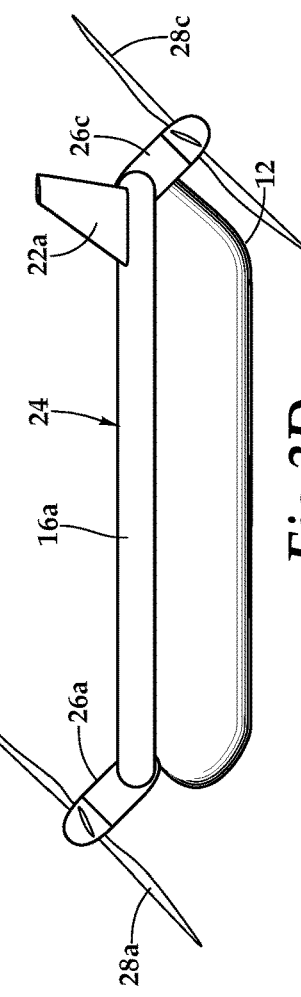

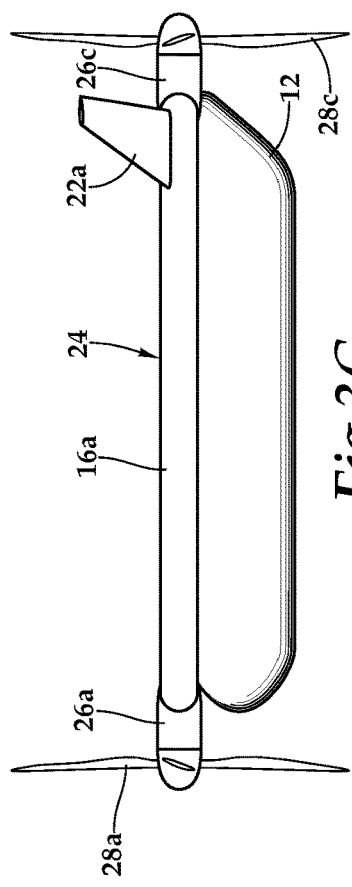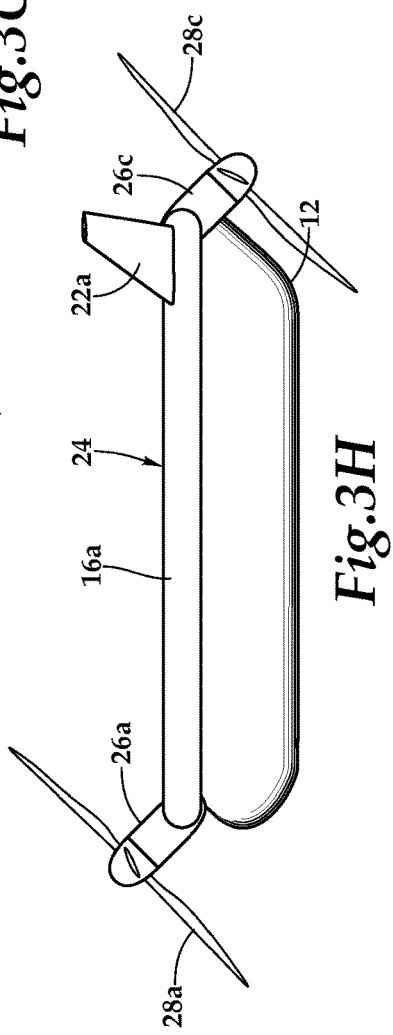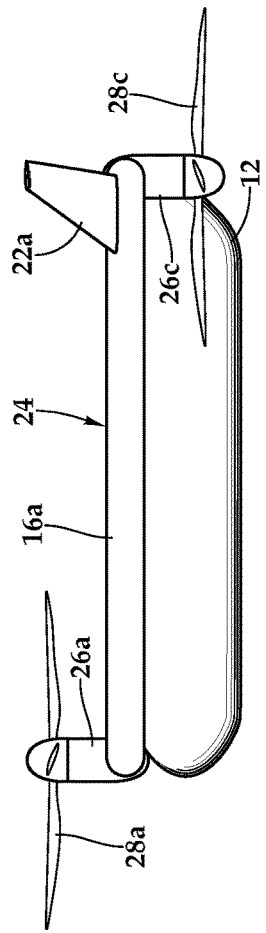

TILTROTOR AIRCRAFT HAVING TILTABLE FORWARD AND AFT ROTORS

CROSS-REFERENCE TO RELATED APPLICATIONS

The present application is a continuation of application Ser. No. 16/750,269 filed Jan. 23, 2020 which is a continuation of application Ser. No. 15/724,669 filed Oct. 4, 2017, now U.S. Pat. No. 10,618,656 B2.

TECHNICAL FIELD OF THE DISCLOSURE

The present disclosure relates, in general, to aircraft having a forward flight mode and a vertical takeoff and landing flight mode and, in particular, to a tiltrotor aircraft having upwardly tiltable forward rotors and downwardly tiltable aft rotors.

BACKGROUND

Fixed-wing aircraft, such as airplanes, are capable of flight using wings that generate lift responsive to the forward airspeed of the aircraft, which is generated by forward thrust from one or more jet engines or propellers. The wings have an airfoil cross section that deflects air downward as the aircraft moves forward, generating vertical lift to support the airplane in flight. Fixed-wing aircraft, however, require a runway for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter, which is a rotorcraft having one or more rotors that provide vertical lift and forward thrust to the aircraft. Helicopter rotors not only enable hovering, vertical takeoff and vertical landing, but also enable, forward, aftward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor is another example of a VTOL aircraft. Tiltrotor aircraft utilize tiltable rotor systems that are operable to transition between a forward thrust orientation and a vertical lift orientation. The rotor systems are tiltable relative to the fixed wing such that the associated proprotors have a generally horizontal plane of rotation for vertical takeoff, hovering and vertical landing and a generally vertical plane of rotation for forward flight, wherein the fixed wing provides lift. In this manner, tiltrotor aircraft combine the vertical lift capability of a helicopter with the speed and range of fixed-wing aircraft.

SUMMARY

In a first aspect, the present disclosure is directed to a tiltrotor aircraft having a vertical takeoff and landing flight mode and a forward flight mode. The aircraft has an airframe including at least one wing. First and second oppositely disposed booms extend longitudinally from the at least one wing. Each of the booms has forward and aft ends. First and second forward rotors are respectively coupled to the forward ends of the first and second booms. The first and second forward rotors are reversibly tiltable between a vertical lift orientation, wherein the first and second forward rotors are above the respective first and second booms, and a forward thrust orientation, wherein the first and second forward rotors are forward of the respective first and second booms. First and second aft rotors are respectively coupled to the aft ends of the first and second booms. The first and second aft rotors are reversibly tiltable between a vertical lift orientation, wherein the first and second aft rotors are below the respective first and second booms, and a forward thrust orientation, wherein the first and second aft rotors are aft of the respective first and second booms.

In certain embodiments, a flight control system may be operably associated with the forward rotors and the aft rotors and operable to independently control each of the rotors including transitions between the vertical lift and the forward thrust orientations. In such embodiments, the flight control system may command operation of the rotors responsive to onboard pilot flight control, remote flight control, autonomous flight control or any combination thereof. In certain embodiments, the forward rotors may be counter rotated and the aft rotors may be counter rotated to control yaw in the vertical takeoff and landing flight mode. In some embodiments, the forward and aft rotors of the first boom may be counter rotated and the forward and aft rotors of the second boom may be counter rotated to control yaw in the vertical takeoff and landing flight mode. In certain embodiments, first and second tail assemblies may be respectively coupled to the aft ends of the first and second booms such that the first and second tail assemblies operate in an upwash in the forward flight mode. In some embodiments, a power system may include at least one electric motor operably associated with each of the rotors and an electric energy source. In certain embodiments, the forward rotors may have folding rotor blades operable to reduce drag in the forward flight mode and the aft rotors may have fixed pitch rotor blades.

In a second aspect, the present disclosure is directed to an aircraft having a vertical takeoff and landing flight mode and a forward flight mode. The aircraft includes a longitudinally extending fuselage. At least one wing extends laterally from the fuselage. First and second booms extend longitudinally from the at least one wing on opposites sides of the fuselage. Each of the booms has forward and aft ends. First and second forward rotors are respectively coupled to the forward ends of the first and second booms. The first and second forward rotors are reversibly tiltable between a vertical lift orientation, wherein the first and second forward rotors are above the respective first and second booms, and a forward thrust orientation, wherein the first and second forward rotors are forward of the respective first and second booms. First and second aft rotors are respectively coupled to the aft ends of the first and second booms. The first and second aft rotors are reversibly tiltable between a vertical lift orientation, wherein the first and second aft rotors are below the respective first and second booms, and a forward thrust orientation, wherein the first and second aft rotors are aft of the respective first and second booms.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3L are schematic illustrations of a tiltrotor aircraft having upwardly tiltable forward rotors and downwardly tiltable aft rotors for transporting interchangeable payload modules in a sequential flight operating scenario in accordance with embodiments of the present disclosure;

DETAILED DESCRIPTION

Figure 1B:
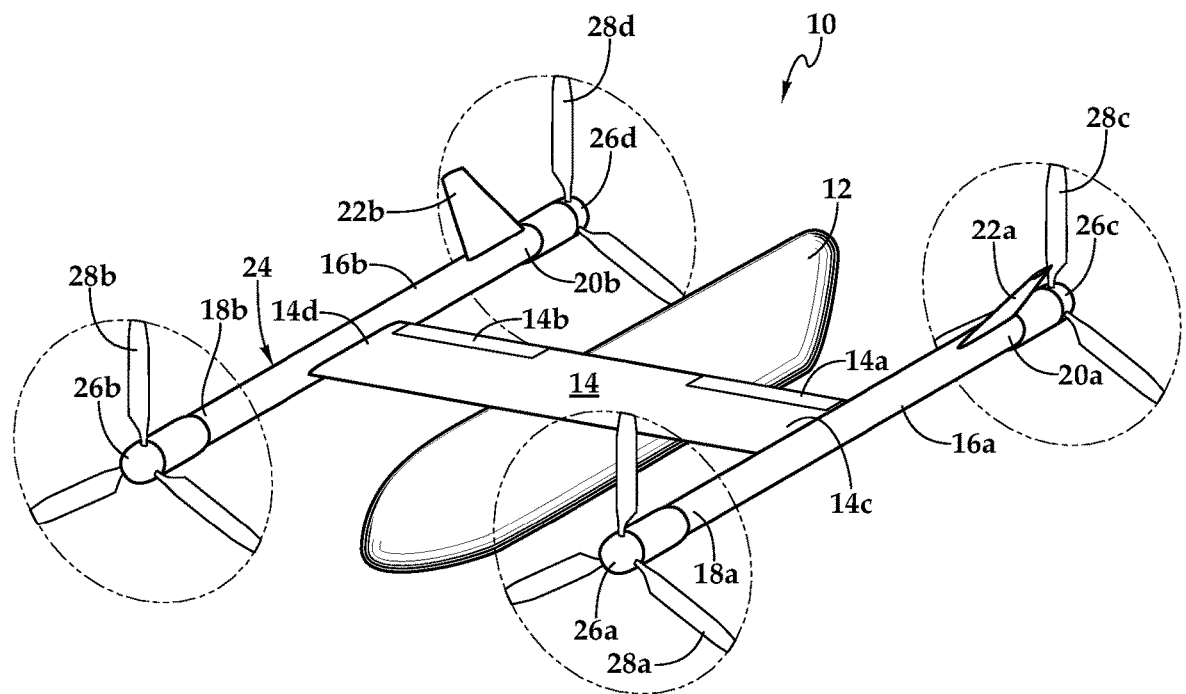
FIGS. 1A-1H are schematic illustrations of a tiltrotor aircraft having upwardly tiltable forward rotors and downwardly tiltable aft rotors for transporting interchangeable payload modules in accordance with embodiments of the present disclosure.
Figure 1A:
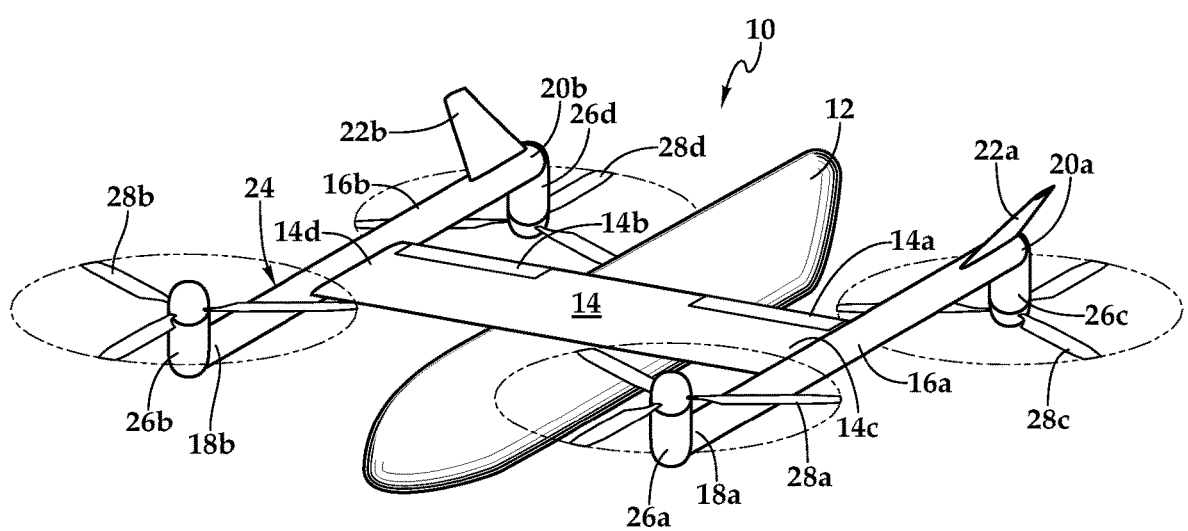
Figure 1D:
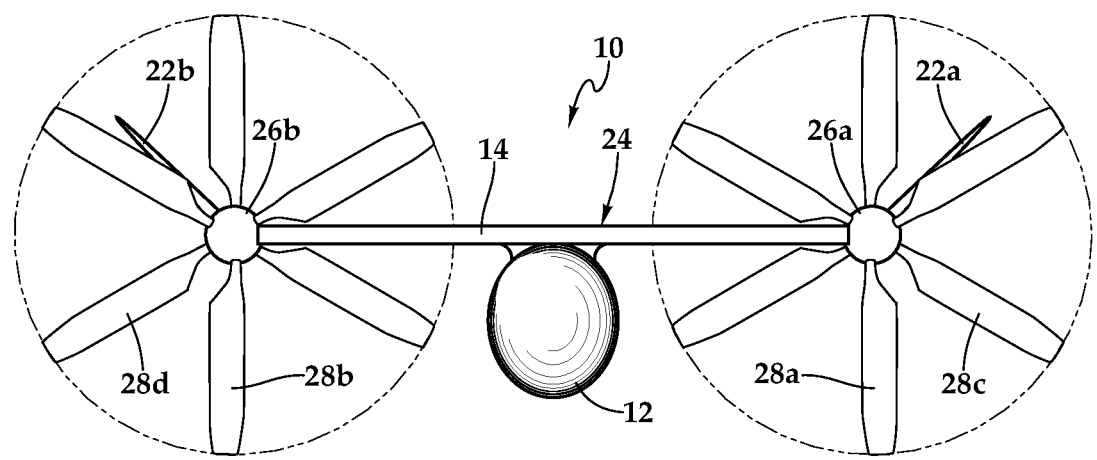
Figure 1C:
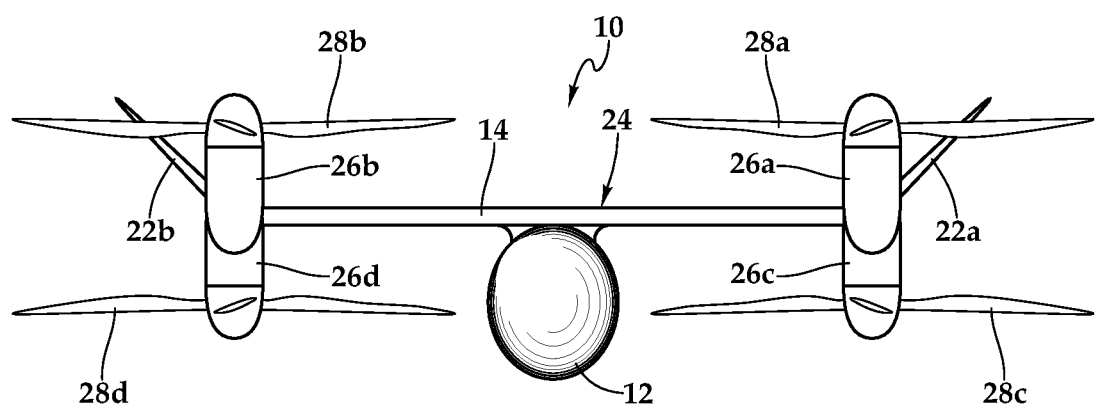
Figure 1F:
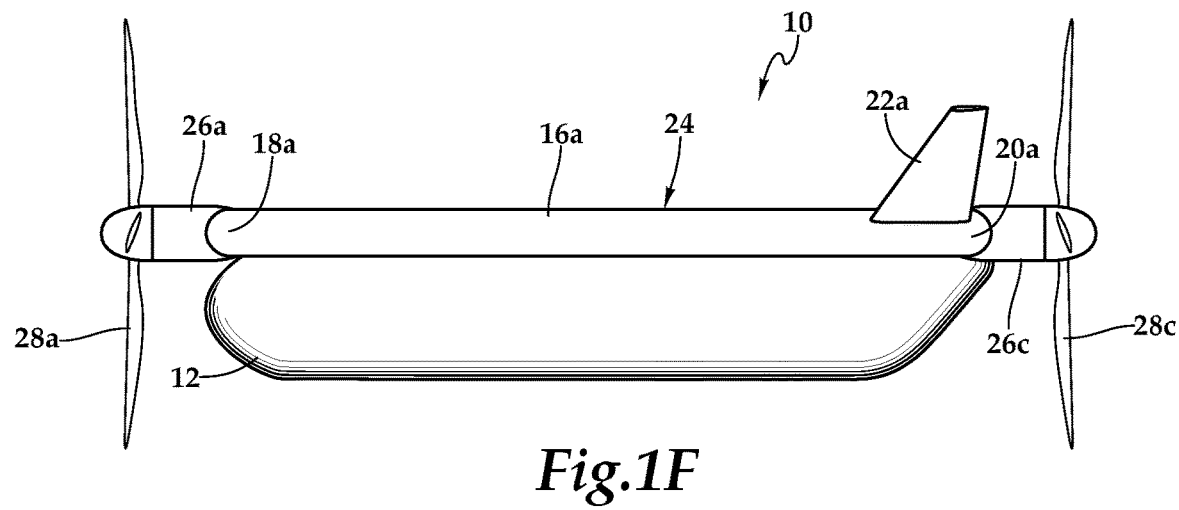
Figure 1E:
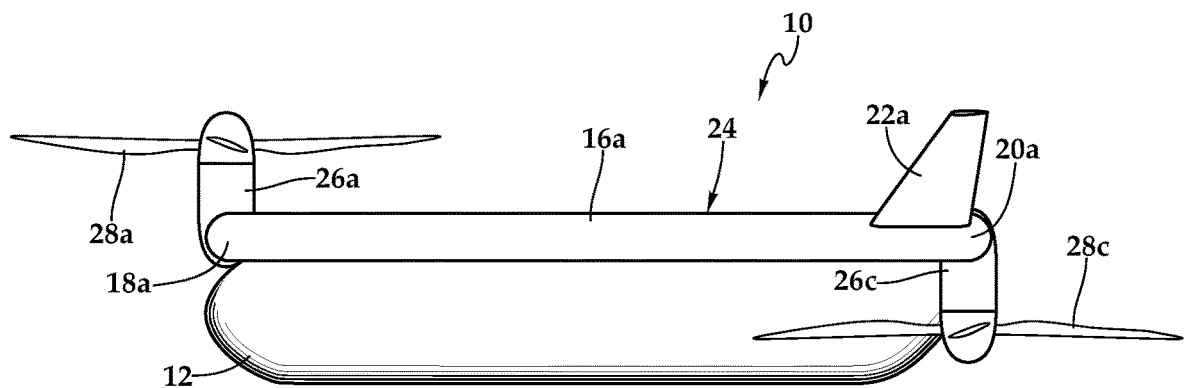
Figure 1H:
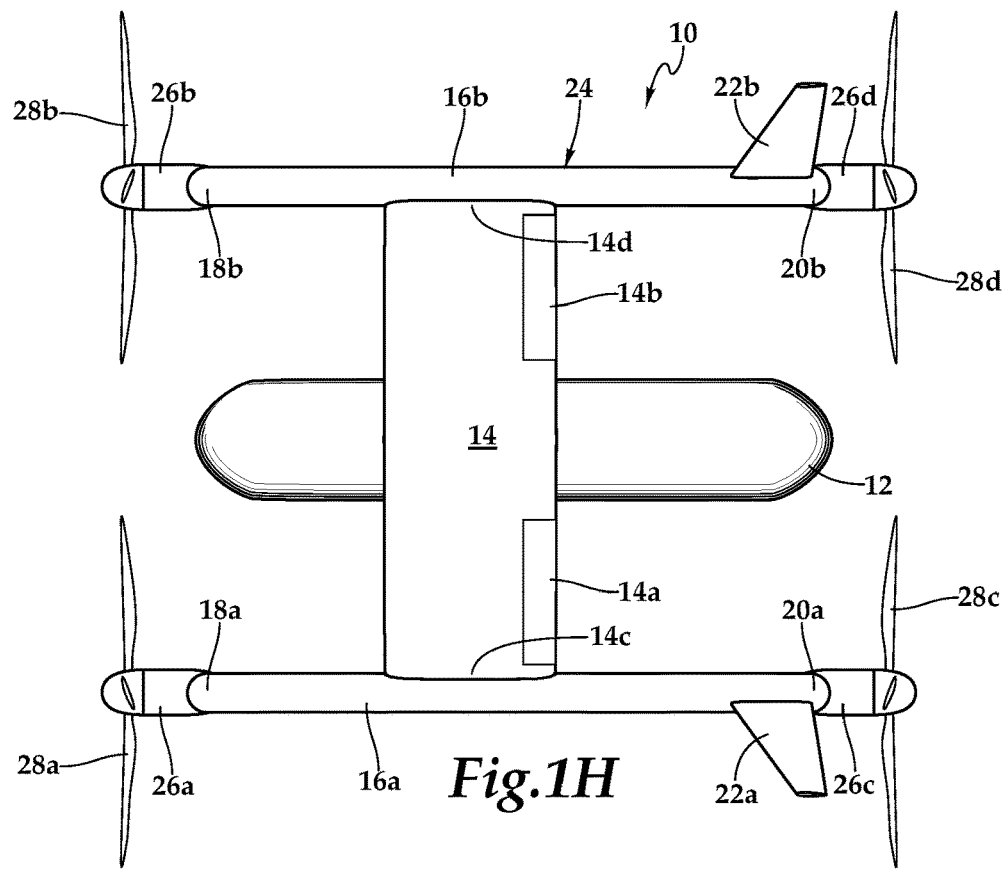
Figure 1G:
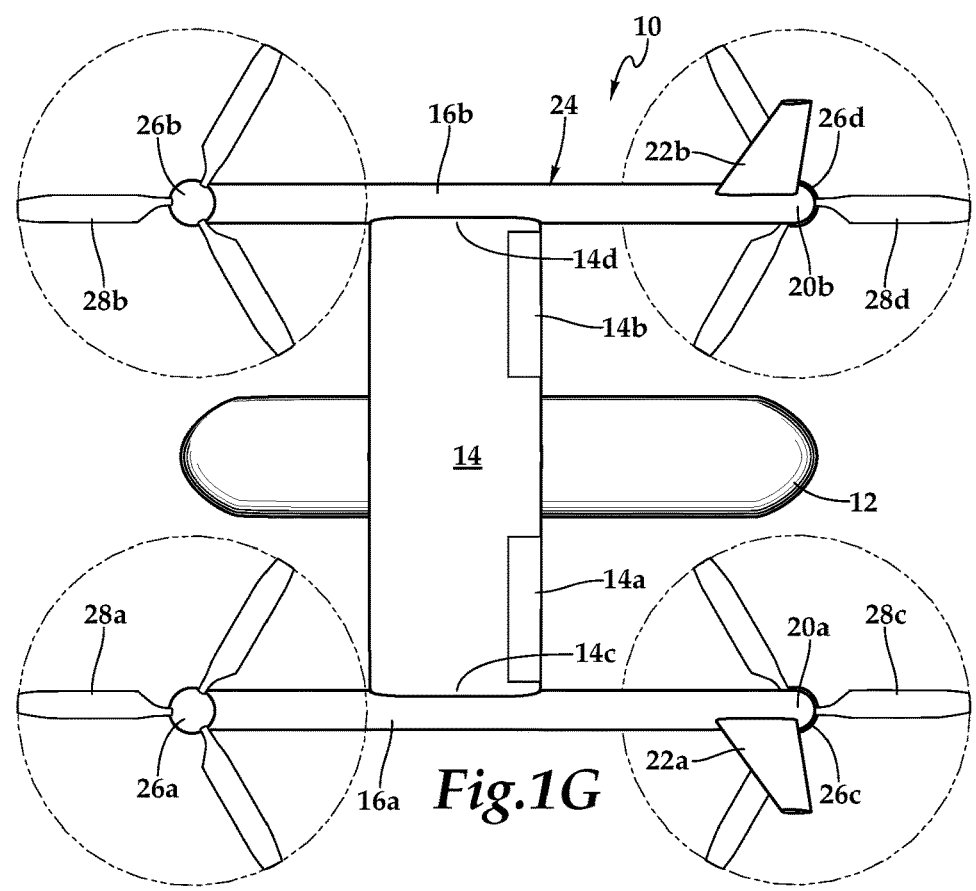

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Referring to FIGS. 1A-1H in the drawings, various views of a tiltrotor aircraft 10 having upwardly tiltable forward rotors and downwardly tiltable aft rotors are depicted. In the illustrated embodiment, aircraft 10 is carrying one of a plurality of longitudinally extending payload modules 12 that may be interchangeably coupled to and transported by aircraft 10. In other embodiments, payload module 12 may represent a fuselage that is a permanent component of aircraft 10. In either case, payload module 12 may be a manned module, an unmanned module, a fuel module, a cargo module, a weapons module, a communications module, a sensor module or the like and combinations thereof. Aircraft 10 includes a wing 14 that extends laterally relative to payload module 12. Wing 14 has an airfoil cross-section that generates lift responsive to the forward airspeed of aircraft 10. In the illustrated embodiment, wing 14 includes flaperons 14a, 14b that provide aerodynamic surfaces for controlling, for example, pitch and roll of aircraft 10 during forward flight. Wing 14 also includes oppositely disposed wing tips 14c, 14d that are distal from payload module 12. Wing 14 is preferably formed from high strength and lightweight materials such as metals, polymers, fiberglass, carbon and combinations thereof.

Aircraft 10 includes a pair of tip booms 16a, 16b that respectively extend longitudinally from wing tips 14c, 14d. Tip boom 16a includes a forward end 18a and an aft end 20a. Tip boom 16b includes a forward end 18b and an aft end 20b. Tip booms 16a, 16b are preferably formed from high strength and lightweight materials such as metals, polymers, fiberglass, carbon and combinations thereof. Aft end 20a of tip boom 16a supports a tail assembly 22a that provides horizontal and/or vertical stabilization and may include a rudder and/or an elevator to aid in pitch and yaw control during forward flight of aircraft 10. Likewise, aft end 20b of tip boom 16b supports a tail assembly 22b that provides horizontal and/or vertical stabilization and may include a rudder and/or an elevator to aid in pitch and yaw control during forward flight of aircraft. Wing 14 and tip booms 16a, 16b preferably include internal passageways operable to contain communication lines such as electrical cables, data cables and the like. Together, wing 14 and tip booms 16a, 16b as well as various frames, supports, longerons, stringers, bulkheads, spars, ribs, skins and the like may be considered to be the airframe 24 of aircraft 10.

Aircraft 10 is operable to transition between a vertical lift orientation, as best seen in FIGS. 1A, 1C, 1E, 1G, and a forward thrust orientation, as best seen in FIGS. 1B, 1D, 1F, 1H. In the illustrated embodiment, a distributed propulsion system is coupled to airframe 24. The distributed propulsion system includes a plurality of propulsion assemblies 26 that may be permanently mounted or independently attachable to and detachable from airframe 24. As illustrated, the distributed propulsion system includes four independently operating propulsion assemblies 26a, 26b, 26c, 26d. Propulsion assemblies 26a, 26b are respectively coupled to forward ends 18a, 18b of tip booms 16a, 16b and may be referred to as forward propulsion assemblies 26a, 26b. Propulsion assemblies 26c, 26d are respectively coupled to aft ends 20a, 20b of tip booms 16a, 16b and may be referred to as aft propulsion assemblies 26c, 26d. Forward propulsion assembly 26a is reversibly tiltable between a vertical lift orientation, wherein rotor 28a is above tip boom 16a, and a forward thrust orientation, wherein rotor 28a is forward of tip boom 16a. Similarly, forward propulsion assembly 26b is reversibly tiltable between a vertical lift orientation, wherein rotor 28b is above tip boom 16b, and a forward thrust orientation, wherein rotor 28b is forward of tip boom 16b. Aft propulsion assembly 26c is reversibly tiltable between a vertical lift orientation, wherein rotor 28c is below tip boom 16a, and a forward thrust orientation, wherein rotor 28c is aft of tip boom 16a. Similarly, aft propulsion assembly 26d is reversibly tiltable between a vertical lift orientation, wherein rotor 28d is below tip boom 16b, and a forward thrust orientation, wherein rotor 28d is aft of tip boom 16b. In the illustrated embodiment, when propulsion assemblies 26a, 26b, 26c, 26d are in the forward thrust orientation, rotors 28a, 28b operate as tractor propellers and rotors 28c, 28d operates as pusher propellers.

As discussed herein, each propulsion assembly 26a, 26b, 26c, 26d is independently controllable such that operational changes of certain propulsion assemblies 26a, 26b, 26c, 26d within the distributed propulsion system enable pitch, yaw and roll control of aircraft 10 during VTOL operations. For example, by changing the thrust output of forward propulsion assemblies 26a, 26b relative to aft propulsion assemblies 26c, 26d, pitch control is achieved. As another example, by changing the thrust output of propulsion assemblies 26a, 26c relative to propulsion assemblies 26b, 26d, roll control is achieved. Changing the thrust output of a particular propulsion assembly 26a, 26b, 26c, 26d may be accomplished by changing the rotational speed and/or blade pitch of the respective rotors 28a, 28b, 28c, 28d. It is noted that some or all of propulsion assemblies 26a, 26b, 26c, 26d may incorporate fixed pitch rotors. Alternatively, some or all of propulsion assemblies 26a, 26b, 26c, 26d may incorporate rotors operable for collective and/or cyclic pitch control. In one implementation, forward propulsion assemblies 26a, 26b have collective pitch control and aft propulsion assemblies 26c, 26d have fixed pitch rotors. Yaw control or torque balance of aircraft 10 during VTOL operations may be achieved by counter rotating forward propulsion assemblies 26a, 26b and counter rotating aft propulsion assemblies 26c, 26d. Alternatively or additionally, yaw control or torque balance of aircraft 10 during VTOL operations may be achieved by counter rotating propulsion assemblies 26a, 26c of tip boom 16a and counter rotating propulsion assemblies 26b, 26d of tip boom 16b. Torque imbalances of aircraft 10 may also be controlled by utilizing differential longitudinal thrust vectoring of one or more of the propulsion assemblies 26a, 26b, 26c, 26d and/or utilizing torque offset of one or more of the propulsion assemblies 26a, 26b, 26c, 26d. It is noted that, changes in rotor speed and/or changes in blade pitch may affect the torque balance of aircraft 10, thus implementation of different torque balancing techniques under different conditions may be desirable.

Propulsion assemblies 26a, 26b, 26c, 26d may preferably be standardized and interchangeable units that are most preferably line replaceable units enabling easy installation and removal from aircraft 10. In addition, the use of line replaceable units is beneficial in maintenance situations if a fault is discovered with one of the propulsion assemblies. In this case, the faulty propulsion assembly can be decoupled from aircraft 10 by simple operations such as unbolting structural members, disconnecting communication lines and other suitable procedures. Another propulsion assembly can then be attached to aircraft 10 by coupling communication lines, bolting structural members together and other suitable procedures.

Figure 2:
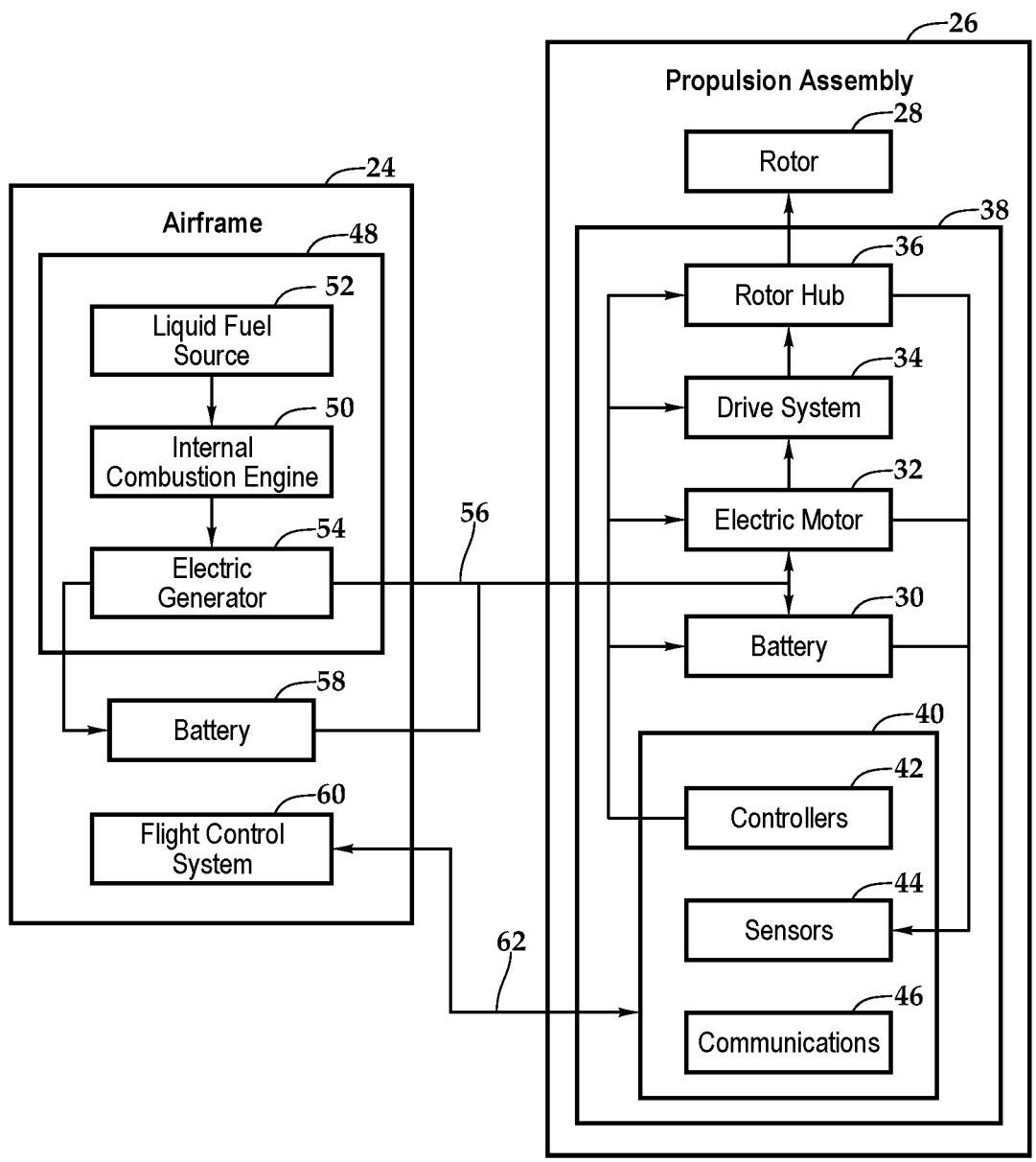
FIG. 2 is block diagram of a propulsion and control system for a tiltrotor aircraft having upwardly tiltable forward rotors and downwardly tiltable aft rotors for transporting interchangeable payload modules in accordance with embodiments of the present disclosure.

As best seen in FIG. 2, each propulsion assembly 26 includes a nacelle 38 that houses one or more batteries 30, an electric motor 32, a drive system 34, a rotor hub 36 and an electronics node 40 including, for example, controllers 42, sensors 44 and communications elements 46 as well as other components suitable for use in the operation of a propulsion assembly. Each propulsion assembly 26 also includes a rotor 28 having a plurality of rotor blades that are securably attached to rotor hub 36. The rotor blades may have a fixed pitch or may be operable for pitch changes including, for example, collective and/or cyclic pitch changes. In addition, each propulsion assembly 26 may be operable for independent thrust vectoring.

In the illustrated embodiment, aircraft 10 has an electrical energy source depicted as a liquid fuel based electrical energy generation system 48 that is housed within airframe 24 such as within wing 14 and/or tip booms 16a, 16b or may be housed within payload module 12 in both interchangeable and fixed implementations of payload module 12. Electrical energy generation system 48 preferably includes one or more internal combustion engines 50. Electrical energy generation system 48 also includes one or more fuel tanks depicted as liquid fuel sources 52. In operation, internal combustion engine 50 is used to drive an electric generator 54 to produce electrical energy. This electrical energy is feed to each propulsion assemblies 26 via communication lines 56 within airframe 24 to directly power electric motors 32 and/or for storage within batteries 30. This type of hybrid power system is beneficial as the energy density of liquid fuel exceeds that of batteries enabling greater endurance for aircraft 10.

Alternatively or additionally, airframe 24 and/or payload module 12 may house one or more batteries 58 that may serve as the electrical energy source for propulsion assemblies 26. Batteries 58 may be charged by electrical energy generation system 48 and/or may be charged at a ground station. Batteries 58 may also be interchangeably removed and installed to enable efficient refueling which may be particularly beneficial in embodiments of aircraft 10 wherein the sole electrical energy source are batteries 58. In one example, each interchangeable payload module may contain batteries 58 such that aircraft 10 is fully recharged each time a new payload module 12 is coupled thereto. In embodiments having both batteries 58 and electrical energy generation system 48, batteries 58 may provide a backup electrical power source to enable aircraft 10 to safely land in the event of a failure in electrical energy generation system 48. As another alternative, propulsion assemblies 26 may include hydraulic motors operated within a common hydraulic fluid system wherein one or more high pressure hydraulic sources or generators are housed within airframe 24 and/or payload module 12 to provide power to each of the hydraulic motors.

In the illustrated embodiment, aircraft 10 has a flight control system 60 that is preferably housed within airframe 24. Flight control system 60, such as a digital flight control system, is preferably a redundant flight control system and more preferably a triply redundant flight control system including three independent flight control computers. Use of triply redundant flight control system 60 improves the overall safety and reliability of aircraft 10 in the event of a failure in flight control system 60. Flight control system 60 preferably includes non-transitory computer readable storage media including a set of computer instructions executable by one or more processors for controlling the operation of the distributed propulsion system. Flight control system 60 may be implemented on one or more general-purpose computers, special purpose computers or other machines with memory and processing capability. For example, flight control system 60 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 60 may be a microprocessor-based system operable to execute program code in the form of machine-executable instructions. In addition, flight control system 60 may be selectively connectable to other computer systems via a proprietary encrypted network, a public encrypted network, the Internet or other suitable communication network that may include both wired and wireless connections.

Flight control system 60 communicates via a wired and/or wireless communications network 62 with electronics node 40 of each propulsion assembly 26. Flight control system 60 receives sensor data from and sends flight command information to electronics nodes 40 such that each propulsion assembly 26 may be individually and independently controlled and operated. In both manned and unmanned missions, flight control system 60 may autonomously control some or all aspects of flight operation for aircraft 10. Flight control system 60 may also be operable to communicate with one or more remote systems, via a wireless communications protocol. The remote systems may be operable to receive flight data from and provide commands to flight control system 60 to enable remote flight control over some or all aspects of flight operation for aircraft 10, in both manned and unmanned missions. In manned missions, a pilot within aircraft 10 may receive flight data from and provide commands to flight control system 60 to enable onboard pilot control over some or all aspects of flight operation for aircraft 10. In particular, transitions of aircraft 10 between the vertical lift orientation and the forward thrust orientation may be accomplished responsive to onboard pilot flight control, remote flight control, autonomous flight control and combinations thereof.

As best seen in FIGS. 1A, 1C, 1E, 1G, aircraft 10 has a vertical takeoff and landing flight mode wherein the distributed propulsion system is in its vertical lift orientation with rotor 28a of forward propulsion assembly 26a above tip boom 16a, rotor 28b of forward propulsion assembly 26b above tip boom 16b, rotor 28c of aft propulsion assembly 26c below tip boom 16a and rotor 28d of aft propulsion assembly 26d below tip boom 16b. In this configuration, each rotor 28a, 28b, 28c, 28d has a generally horizontal orientation taking into account the attitude of aircraft 10. Flight control system 60 independently controls and operates each propulsion assembly 26a, 26b, 26c, 26d to generate lift as well as provide pitch, yaw and roll control. In the illustrated configuration, the propwash generated by forward propulsion assemblies 26a, 26b creates a minimum download on airframe 24 impeded only by forward ends 18a, 18b of tip booms 16a, 16b. The propwash generated by aft propulsion assemblies 26c, 26d is entirely unimpeded by airframe 24 and thus creates no download on airframe 24. This unique configuration of propulsion assemblies 26a, 26b, 26c, 26d on airframe 24 provides high lift efficiency for aircraft 10.

As best seen in FIGS. 1B, 1D, 1F, 1H, aircraft 10 has a forward flight mode wherein the distributed propulsion system is in its forward thrust orientation with rotor 28a of forward propulsion assembly 26a forward of tip boom 16a, rotor 28b of forward propulsion assembly 26b forward of tip boom 16b, rotor 28c of aft propulsion assembly 26c aft of tip boom 16a and rotor 28d of aft propulsion assembly 26d aft of tip boom 16b. Each rotor 28a, 28b, 28c, 28d has a generally vertical orientation taking into account the attitude of aircraft 10. Flight control system 60 independently controls and operates each propulsion assembly 26a, 26b, 26c, 26d to generate the required thrust with wing 14 providing lift and with aerodynamic surfaces including as flaperons 14a, 14b and tail assemblies 22a, 22b providing pitch, yaw and roll control. In the illustrated configuration, the propwash generated by forward propulsion assemblies 26a, 26b travels generally in the chordwise direction of wing 14 and the propwash generated by aft propulsion assemblies 26c, 26d is entirely unimpeded by airframe 24. Due to the configuration of airframe 24, tail assemblies 22a, 22b operate in an upwash of wing 14 in the forward flight mode. For example, tail assemblies 22a, 22b operate in a dynamic pressure ratio of between about 1.0 and about 1.3 in the forward flight mode which contributes to the stability of aircraft 10 in forward flight mode. In addition, as the thrust requirements in forward flight mode are reduced compared to the lift requirements of vertical takeoff and landing flight mode, during forward flight, flight control system 60 may reduce the rotational speeds of some or all of propulsion assemblies 26a, 26b, 26c, 26d. Alternatively or additionally, flight control system 60 may shut down certain of the propulsion assemblies 26a, 26b, 26c, 26d during forward flight, in which case, the associated rotor blades may be allowed to windmill, may be locked against rotation or may be folded and locked. For example, flight control system 60 may shut down forward propulsion assemblies 26a, 26b while operating aft propulsion assemblies 26c, 26d during forward flight.

Figure 3J:
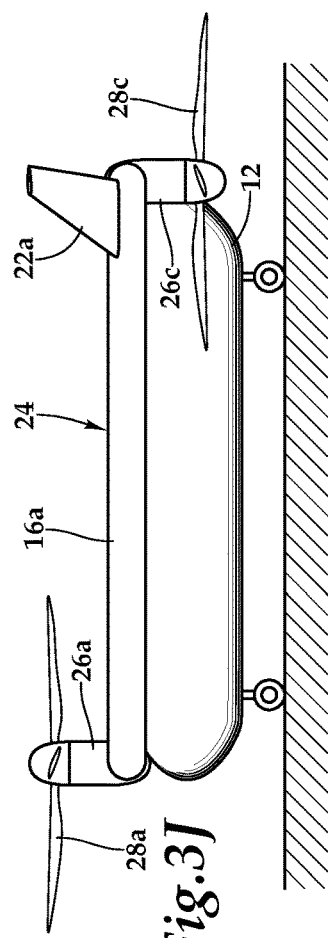

Referring next to FIGS. 3A-3L in the drawings, a sequential flight-operating scenario of aircraft 10 is depicted. As discussed herein, payload module 12 is selectively attachable to airframe 24 such that a single airframe can be operably coupled to and decoupled from numerous payload modules for numerous missions over time. As best seen in FIG. 3A, payload module 12 is positioned on a surface at a current location such as at a worksite, in a military theater, on the flight deck of an aircraft carrier or other location. In the illustrated embodiment, payload module 12 includes retractable wheel assemblies that enable ground transportation of payload module 12. In other embodiments, payload module 12 may include skids or may have another suitable ground interface. As illustrated, airframe 24 is currently in an approach pattern near payload module 12 in its vertical takeoff and landing mode with all propulsion assemblies 26 operating. For example, airframe 24 may have been dispatched from a staging location to perform the mission of transporting payload module 12 from the current location to a destination. Airframe 24 may be operated responsive to autonomous flight control based upon a flight plan preprogrammed into flight control system 60 or may be operated responsive to remote flight control. In either case, airframe 24 may be operable to identify the current location of payload module 12 using, for example, global positioning system information or other location based system information.

As best seen in FIG. 3B, airframe 24 has been connected with payload module 12 to create a mechanical coupling and, in some embodiments, a communication channel therebetween. As best seen in FIG. 3C, payload module 12 is fully supported by airframe 24 operating in VTOL mode. Once payload module 12 is attached to airframe 24, the flight control system of airframe 24 may be responsive to autonomous flight control, remote flight control, onboard pilot flight control or any combination thereof. For example, in manned missions, it may be desirable to utilize onboard pilot flight control of a pilot within payload module 12 during certain maneuvers such at takeoff and landing but rely on remote or autonomous flight control during periods of forward flight.

Regardless of the chosen flight control mode, each of the propulsion assemblies 26 is independently controllable during flight operations. For example, as best seen in FIG. 3C, to aid in stabilization during VTOL operations including pitch, roll and yaw control during hover, it may be desirable to adjust the thrust output, torque output and/or thrust vector of one or more of propulsion assemblies 26 as discussed herein. After vertical assent to the desired elevation, aircraft 10 may begin the transition from vertical takeoff to forward flight. As best seen in FIGS. 3C-3E, as aircraft 10 transitions from vertical takeoff and landing flight mode to forward flight mode, the forward propulsion assemblies transition from the vertical lift orientation, as best seen in FIG. 3C, to the forward thrust orientation, as best seen in FIG. 3E, by tilting from an upwardly pointing orientation to a forward pointing orientation. Likewise, the aft propulsion assemblies transition from the vertical lift orientation, as best seen in FIG. 3C, to the forward thrust orientation, as best seen in FIG. 3E, by tilting from a downwardly pointing orientation to an aftwardly pointing orientation. It is noted that aircraft 10 remains in a generally horizontal attitude during this transition for the safety and comfort of passengers, crew and/or cargo carried in aircraft 10.

Once aircraft 10 has completed the transition to forward flight mode, certain of the propulsion assemblies 26 may be operated at reduced speed or shut down as the thrust requirements in forward flight mode are reduced compared to the thrust requirements of vertical takeoff and landing flight mode. For example, as best seen in FIG. 3F, the forward propulsion assemblies have been shut down and the rotor blades have folded to reduce drag. Alternatively, after the forward propulsion assemblies have been shut down the rotor blades may be feathered with the rotor hubs unlock allowing the rotors to windmill or the rotors may be locked from rotating without folding.

Figure 3K:
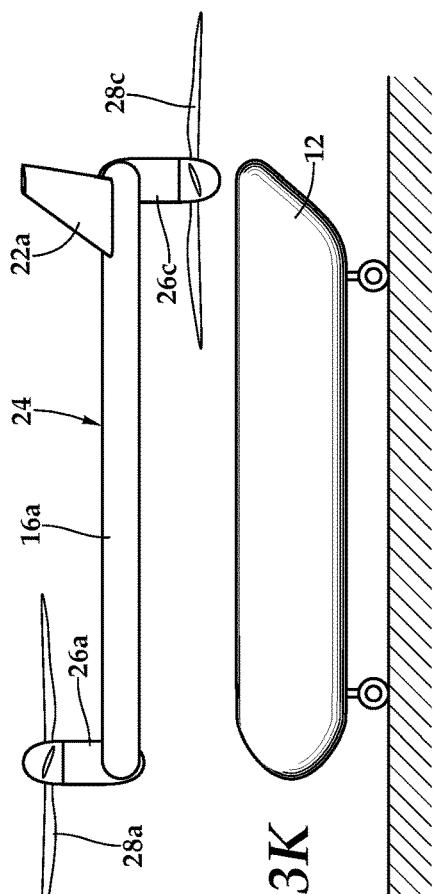
Figure 3L:
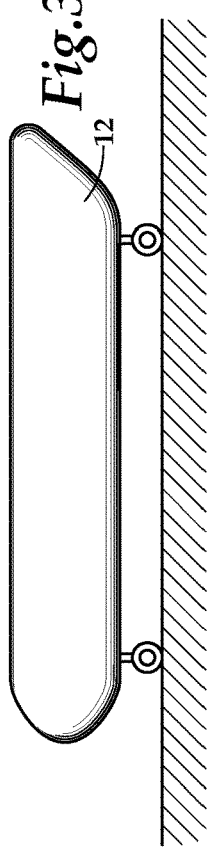

When aircraft 10 begins its approaches to the destination, any propulsion assemblies 26 that were shut down or operated at a reduced speed are reengaged to provide full propulsion capabilities, as best seen in 3G. Aircraft 10 may now begin its transition from forward flight mode to vertical takeoff and landing flight mode. As best seen in FIGS. 3G-3I, as aircraft 10 transitions from forward flight mode to vertical takeoff and landing flight mode, the forward propulsion assemblies transition from the forward thrust orientation, as best seen in FIG. 3G, to the vertical lift orientation, as best seen in FIG. 3I, by tilting from the forward pointing orientation to the upward pointing orientation. Likewise, the aft propulsion assemblies transition from the forward thrust orientation, as best seen in FIG. 3G, to the vertical lift orientation, as best seen in FIG. 3I, by tilting from the aftwardly pointing orientation to the downwardly pointing orientation. It is noted that aircraft 10 remains in a generally horizontal attitude during this transition for the safety and comfort of passengers, crew and/or cargo carried in aircraft 10. Once aircraft 10 has completed the transition to vertical takeoff and landing flight mode, as best seen in FIG. 3I, aircraft 10 may commence its vertical descent to a landing surface at the destination location. Payload module 12 may now lower its wheel assemblies to provide ground support for landing aircraft 10, as best seen in FIG. 3J. Airframe 24 is now decoupled from payload module 12, as best seen in FIG. 3K. After transporting and releasing payload module 12 at the destination, airframe 24 may depart from the destination for another location and payload module 12 may be repositioned to a desired location using wheel assemblies to enable ground transportation, as best seen in FIG. 3L.

Figure 4:
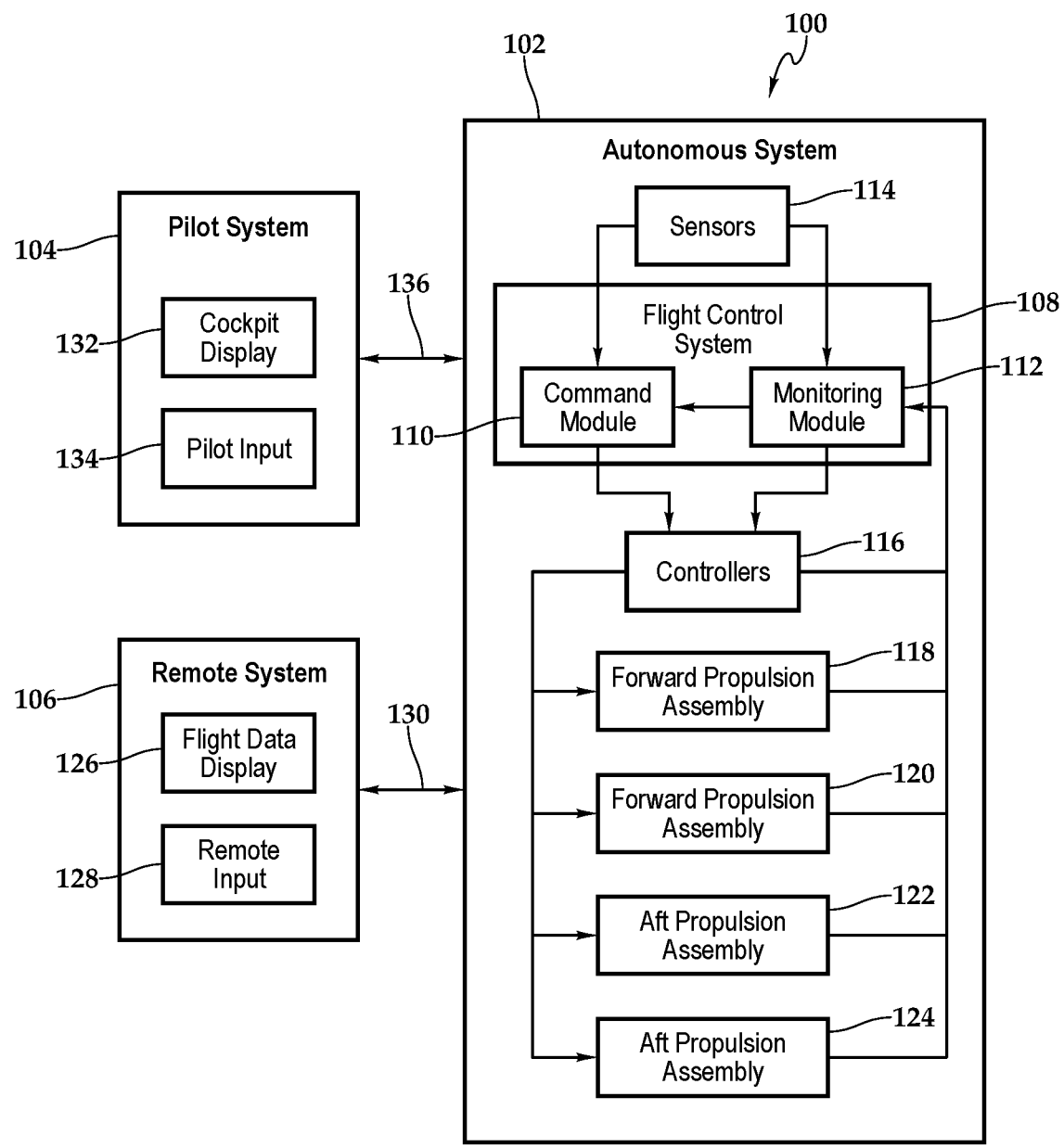
FIG. 4 is a block diagram of a control system for a tiltrotor aircraft having upwardly tiltable forward rotors and downwardly tiltable aft rotors for transporting interchangeable payload modules in accordance with embodiments of the present disclosure.

Referring additionally to FIG. 4 in the drawings, a block diagram depicts an aircraft control system 100 operable for use with aircraft 10 of the present disclosure. In the illustrated embodiment, system 100 includes three primary computer based subsystems; namely, an autonomous system 102, a pilot system 104 and a remote system 106. As discussed herein, the aircraft of the present disclosure may be operated autonomously responsive to commands generated by flight control system 108 that preferably includes a non-transitory computer readable storage medium including a set of computer instructions executable by a processor. Flight control system 108 may be a triply redundant system implemented on one or more general-purpose computers, special purpose computers or other machines with memory and processing capability. For example, flight control system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 108 may be a microprocessor-based system operable to execute program code in the form of machine-executable instructions. In addition, flight control system 108 may be selectively connectable to other computer systems via a proprietary encrypted network, a public encrypted network, the Internet or other suitable communication network that may include both wired and wireless connections.

In the illustrated embodiment, flight control system 108 includes a command module 110 and a monitoring module 112. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 114, controllers 116, propulsion assemblies 118, 120, 122, 124 and pilot system 104 as well as external sources such as remote system 106, global positioning system satellites or other location positioning systems and the like. For example, flight control system 108 may receive a flight plan including starting and ending locations for a mission from pilot system 104 and/or remote system 106. Thereafter, flight control system 108 is operable to autonomously control all aspects of flight of an aircraft of the present disclosure.

For example, during the various operating modes of aircraft 10 including vertical takeoff and landing flight mode, hover flight mode, forward flight mode and transitions therebetween, command module 110 provides commands to controllers 116. These commands enable independent operation of each propulsion assembly 118, 120, 122, 124 including, for example, controlling the rotational speed of the rotors, changing the pitch of the rotor blades, adjusting the thrust vectors and the like. In addition, these commands enable transition of aircraft 10 between the vertical lift orientation and the forward thrust orientation. Flight control system 108 receives feedback from controllers 116 and each propulsion assembly 118, 120, 122, 124. This feedback is processes by monitoring module 112 that can supply correction data and other information to command module 110 and/or controllers 116. Sensors 114, such as positioning sensors, attitude sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by a remote flight control system 106. Remote system 106 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 106 communicates with flight control system 108 via a communication link 130 that may include both wired and wireless connections.

Remote system 106 preferably includes one or more flight data display devices 126 configured to display information relating to one or more aircraft of the present disclosure. Display devices 126 may be configured in any suitable form, including, for example, liquid crystal displays, light emitting diode displays, cathode ray tube displays or any suitable type of display. Remote system 106 may also include audio output and input devices such as a microphone, speakers and/or an audio port allowing an operator to communicate with, for example, a pilot on board aircraft 10. The display device 126 may also serve as a remote input device 128 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 104. Pilot system 104 may be integrated with autonomous system 102 or may be a standalone system preferably including a non-transitory computer readable storage medium including a set of computer instructions executable by a processor and may be implemented by a general-purpose computer, a special purpose computer or other machine with memory and processing capability. Pilot system 104 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Pilot system 104 may be a microprocessor-based system operable to execute program code in the form of machine-executable instructions. In addition, pilot system 104 may be connectable to other computer systems via a proprietary encrypted network, a public encrypted network, the Internet or other suitable communication network that may include both wired and wireless connections. Pilot system 104 may communicate with flight control system 108 via a communication channel 136 that preferably includes a wired connection.

Pilot system 104 preferably includes a cockpit display device 132 configured to display information to an onboard pilot. Cockpit display device 132 may be configured in any suitable form, including, for example, as one or more display screens such as liquid crystal displays, light emitting diode displays and the like or any other suitable display type including, for example, a display panel, a dashboard display, an augmented reality display or the like. Pilot system 104 may also include audio output and input devices such as a microphone, speakers and/or an audio port allowing an onboard pilot to communicate with, for example, air traffic control or an operator of a remote system. Cockpit display device 132 may also serve as a pilot input device 134 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 100, an aircraft of the present disclosure can be operated responsive to a flight control protocol including autonomous flight control, remote flight control or onboard pilot flight control and combinations thereof.

Figure 5:
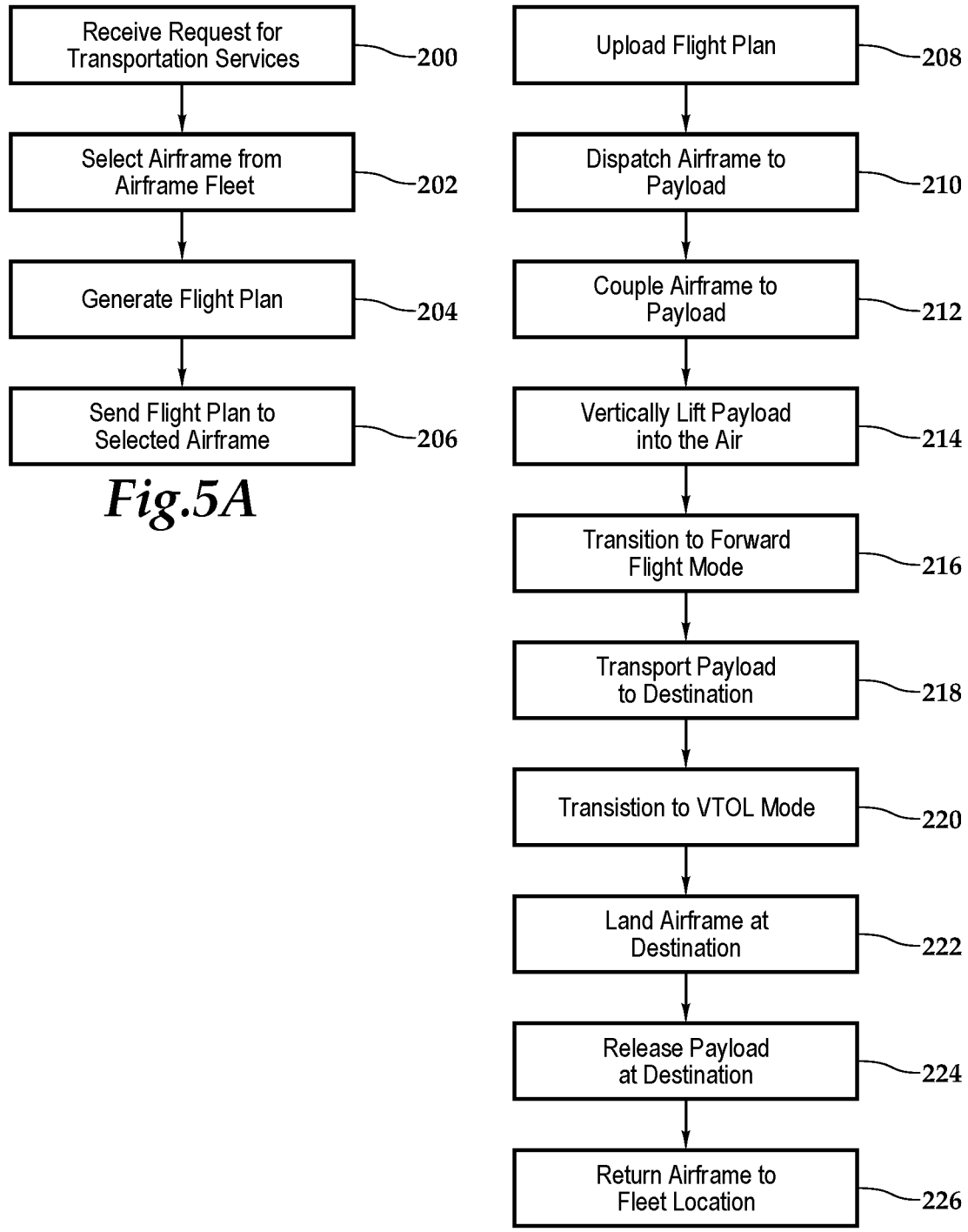
FIGS. 5A-5B are block diagrams of a transportation process for interchangeable payload modules using a tiltrotor aircraft having upwardly tiltable forward rotors and downwardly tiltable aft rotors in accordance with embodiments of the present disclosure.

Referring now to FIGS. 5A-5B of the drawings, one embodiment of a process for transporting a payload module by air from a current location to a destination will now be described. A first step of the process involves receiving a request for transportation services by a transportation services provider, as indicated in block 200 of FIG. 5A. The request may be made over a telephone network from a person desiring transportation of a payload module and received by an operator at the transportation services provider, in which case, the operator logs the request into the transportation services provider computing system. Alternatively, the request may be received directly by the transportation services provider computing system over a data communication network from a computer device, such as a desktop computer or mobile computing device, of the person desiring transportation. Once the transportation request is received in the transportation services provider computing system, an airframe is selected from, for example, a fleet of airframes maintained at a hub or other transportation services provider location, as indicated in block 202. The transportation services provider computing system then generates a flight plan, as indicated in block 204, including at least the current location of the payload module and the destination location for the payload module. The next step involves sending the flight plan from the transportation services provider computing system to the flight control system of the selected airframe, as indicated in block 206.

Depending upon the relative locations of the transportation services provider computing system and the selected airframe, this communication may take place via a wired and/or wireless communication network such as a local area network, a wireless local area network, the Internet or other suitable network.

The reminder of the steps of the present embodiment of a process for transporting the payload module are performed by the flight control system of the selected payload module, as best seen in FIG. 5B. The next step involves uploading the flight plan to the flight control system of the selected payload module, as indicated in block 208. The airframe may now be operated responsive to autonomous flight control, remote flight control or a combination thereof. Regardless of flight control mode, the next step is dispatching the selected airframe from the transportation services provider location to the current location of the payload module to be transported, as indicated in block 210. This step may involve departing from the transportation services provider location, selecting a flight path to the current location of the payload module, identifying a landing zone proximate the current location of the payload module, performing an approach and landing, then positioning the airframe relative to the payload module to enable attachment therebetween. The next step is coupling the airframe to payload module, as indicated in block 212. The process of coupling the airframe to the payload module may be autonomous, manual or a combination thereof. In any case, the coupling process includes forming a mechanical connection and preferably establishing a communication channel therebetween.

The airframe may now be operated responsive to autonomous flight control, remote flight control, onboard pilot flight control or a combination thereof. Once the payload module is properly coupled to the airframe, the airframe lifts the payload module into the air in a vertical takeoff and landing mode, as indicated in block 214. During the vertical takeoff, the payload module is preferably maintained in a generally horizontal attitude and each of the propulsion assemblies of the distributed propulsion system are independently operated using, for example, selective collective pitch and selective thrust vectoring as discussed herein. Once the airframe has reached a desired altitude in vertical takeoff and landing mode, the next step is transitioning the airframe from the vertical takeoff and landing mode to a forward flight mode, as indicate in block 216.

Once in forward flight mode, the next step is transporting the payload module to the desired destination location, as indicated in block 218. Depending upon factors such as the distance of travel and environmental conditions, it may be desirable to shut down certain propulsion assemblies, as discussed herein, during forward flight. As the airframe approaches the destination, the next step is transitioning the airframe from the forward flight mode to the vertical takeoff and landing mode, as indicated in block 220. The next step is landing the airframe at the destination, as indicated in block 222. This step may involve identifying a landing zone and performing an approach in the vertical takeoff and landing mode. Once on the ground, the airframe may release the payload module at the destination location, as indicated in block 224. Thereafter, the next step is returning the airframe from the destination of the payload module to the transportation services provider location, as indicate in block 226.

As should be understood by those skilled in the art, the process for transporting a payload module by air from its current location to a destination described with reference to FIGS. 5A-5B is merely one example of many missions an airframe of the present disclosure could perform. While the described mission included a round trip from a transportation services provider location to provide transportation to a single payload module, an airframe of the present disclosure could alternatively provide sequential transportation events for multiple payload modules during a single trip into the field without returning to the transportation services provider location in between. Likewise, an airframe of the present disclosure could transport a single payload module to multiple locations with multiple takeoff and landing events during a single mission. Accordingly, those skilled in the art will recognize that the airframes of the present disclosure may perform an array of useful and versatile missions involving transportation of a variety of manned and unmanned payload modules.

Figure 6:
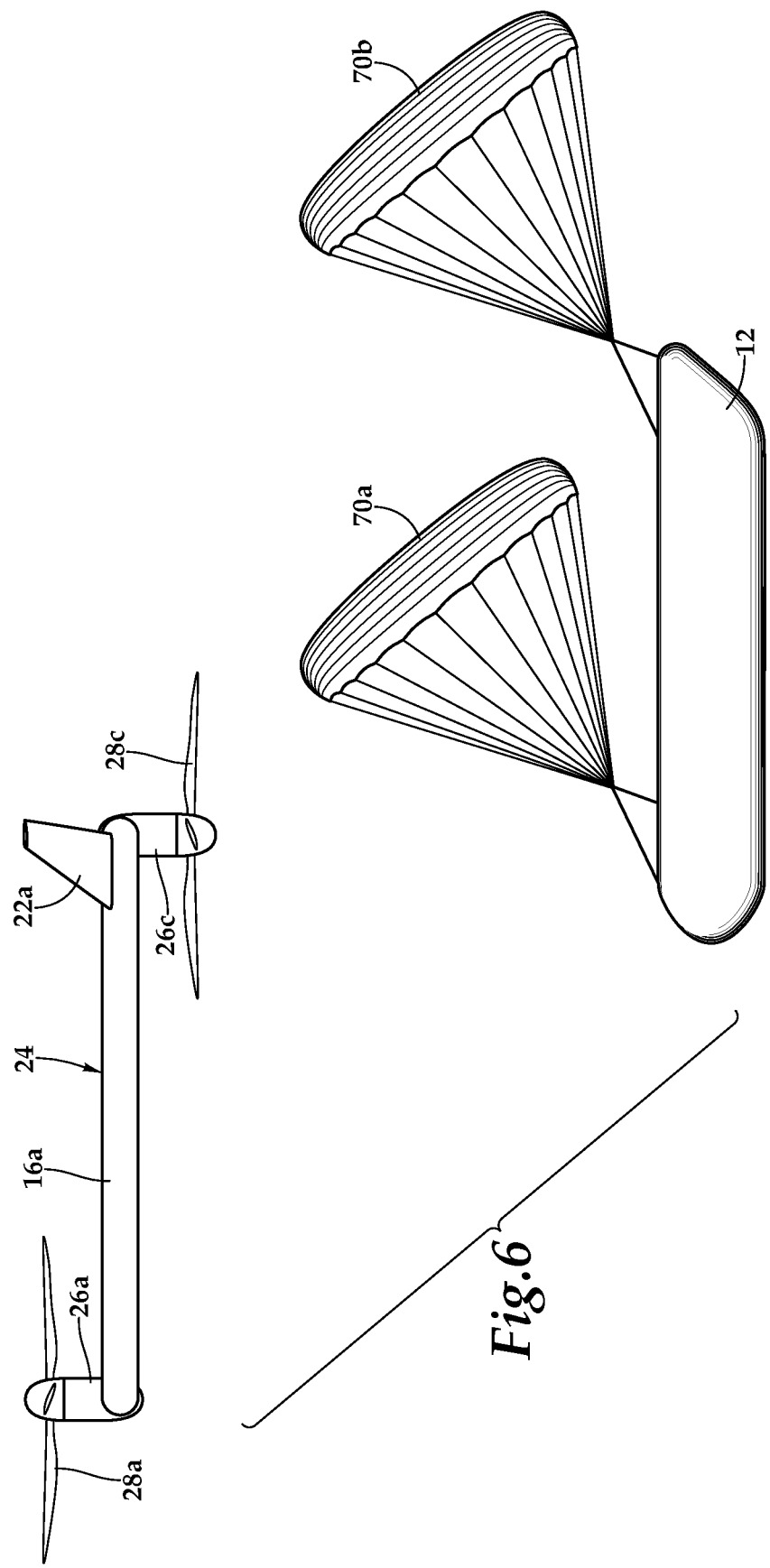
FIG. 6 is a schematic illustration of a tiltrotor aircraft having upwardly tiltable forward rotors and downwardly tiltable aft rotors during a payload module jettison operation in accordance with embodiments of the present disclosure.

Referring to FIG. 6 in the drawings, a payload module jettison sequence is depicted. For example, this could represent an emergency event in a manned mission or a cargo drop mission such as delivering humanitarian supplies to a remote area after a hurricane or other natural disaster. In one example, if sensors on board airframe 24 indicate a critical condition relating to the continued operability of airframe 24, the flight control system, based upon onboard pilot commands, remote commands and/or autonomous commands, can initiate a payload module jettison sequence. In accordance with the jettison command, airframe 24 releases payload module 12. Concurrently therewith or thereafter, payload module 12 deploys one or more parachutes 70a, 70b. Preferably, parachutes 70a, 70b may be parafoil parachute having an aerodynamic cell structure that is inflated responsive to incoming air flow that provides both steerability and a controlled rate of descent to minimize the landing impact payload module 12 on a surface or in the water, in which case, payload module 12 is preferably watertight.

Continuing with the example of a critical condition on board airframe 24 and in the event that airframe 24 is unable to continue flight even after payload module 12 has been jettisoned, airframe 24 along with its fuel supply will likely land remote from payload module 12, thus minimizing the risk to passengers and/or crew of payload module 12 to fire and/or other hazards. Once payload module 12 has been jettisoned, however, the reduction in weight may enable airframe 24 to continue flight and perform a controlled descent and landing. In this case, airframe 24 may be preprogrammed to return to a home base or commanded in real-time to fly to a safe location determined by a remote operator or autonomously by the flight control system. Preferably, the safe location may be proximate the landing location of payload module 12.

Figure 7:
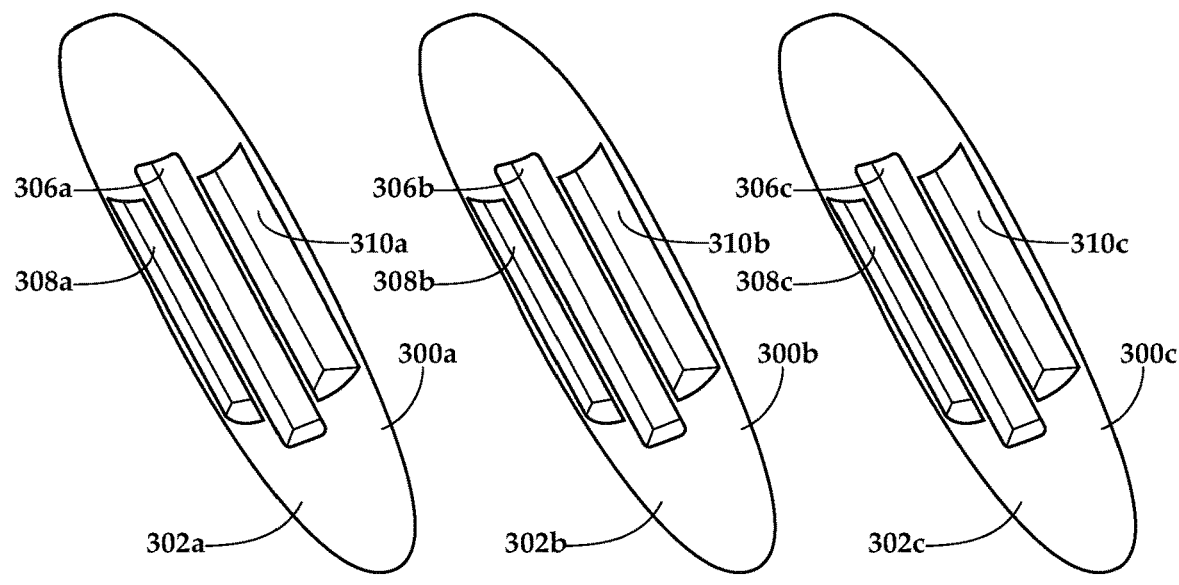
FIG. 7 is a schematic illustration of interchangeable payload modules having a plurality of bays for use with a tiltrotor aircraft having upwardly tiltable forward rotors and downwardly tiltable aft rotors in accordance with embodiments of the present disclosure.

Referring to FIG. 7, a plurality of interchangeable payload modules 300a, 300b, 300c operable to receive a plurality of interchangeable payload packages for use with an aircraft of the present disclosure having upwardly tiltable forward rotors and downwardly tiltable aft rotors are shown. Undersides 302a, 302b, 302c of payload modules 300a, 300b, 300c respectively include central modular bays 306a, 306b, 306c and side modular bays 308a, 308b, 308c, 310a, 310b, 310c. In the illustrated embodiment, the side modular bays flank the central modular bays and are also abreast relative to one another. The central modular bays are sized differently than the side modular bays allowing the modular bays to accept different sized payload packages. In one non-limiting example, the side modular bays may be used for sensors and air-to-ground weapons while the central modular bay may be used for oversized payloads such as torpedoes and air-to-air weapons. Even though payload modules 300a, 300b, 300c have been depicted and described as having three modular bays in a particular configuration, it should be understood by those having ordinary skill in the art that payload modules of the present disclosure could have other configurations including configurations having other numbers of modular bays such as configurations having no modular bays. Those skilled in the art will understand that the illustrated configuration is merely one of numerous payload module implementations and that payload modules of the present disclosure may assume a wide range of specific implementations.

Figures 8A, 8B, 8C:
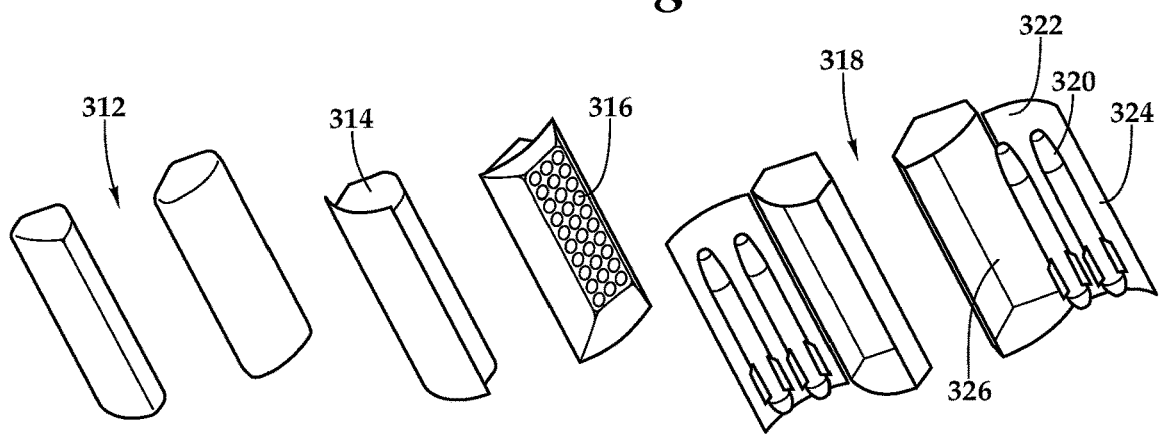
FIGS. 8A-8G are isometric views of various payload packages having different functions for use with interchangeable payload modules of a tiltrotor aircraft having upwardly tiltable forward rotors and downwardly tiltable aft rotors in accordance with embodiments of the present disclosure.

Referring additionally to FIGS. 8A-8C, various payload packages having different respective functions are shown. These payload packages are interchangeably insertable into side modular bays 308a, 308b, 308c, 310a, 310b, 310c which are sized to receive the illustrated payload packages. FIG. 8A illustrates fuel packages 312, which are capable of carrying fuel tanks or bags to be used by airframe 24. FIG. 3B illustrates a light detection and ranging (LIDAR) package 314 and a sonobuoy launcher package 316. The sonobuoy launcher package 316 may be any size, such as a 30 "G" size. LIDAR package 314 and sonobuoy launcher package 316 are air reconnaissance and anti-submarine warfare packages, respectively, that allow aircraft 10 to perform reconnaissance operations. FIG. 3C illustrates weapons packages 318 that include missiles 320 mounted on an inner surface 322 of a bay door 324. In one non-limiting example, missiles 320 are air-to-ground missiles such as Hellfire or JAGM missiles.

Figures 8D, 8E, 8F, 8G:
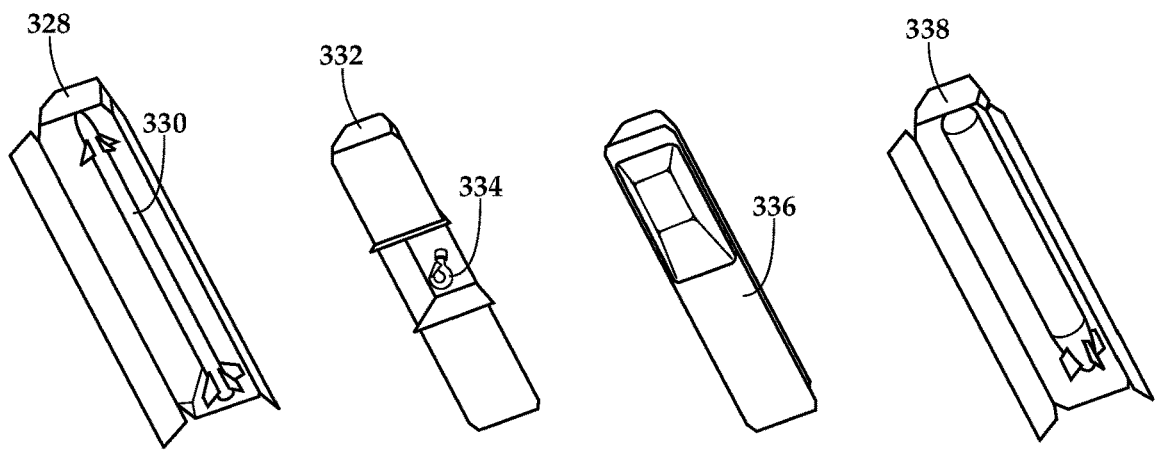

Referring additionally to FIGS. 8D-8G, various payload packages having different respective functions are shown. These payload packages are interchangeably insertable into central modular bays 306a, 306b, 306c, which are sized to receive the illustrated payload packages. FIG. 8D shows a weapons package 328 that includes a short range air-to-air missile 330, such as an AIM-9 Sidewinder missile. FIG. 8E illustrates a combination package 332 that includes a cargo hook 334 as well as storage capacity for fuel or other cargo. Combination packages, such as combination package 332, allow more than one function to be integrated into a single payload package. FIG. 8F shows a reconnaissance package 336, such as a 360 degree surface radar or multispectral sensor. FIG. 8G illustrates an anti-submarine warfare package 338. In the illustrated embodiment, anti-submarine warfare package 338 includes an MK50 torpedo. The wide range of functions of the payload packages shown in FIGS. 8A-8G and thus the wide range of functions of various payload modules 300a, 300b, 300c are exemplary of the numerous functions that are supported by the aircraft of the present disclosure. The payload packages are interchangeable in the modular bays and the payload modules are interchangeable on airframe 24, thus allowing the aircraft of the present disclosure to perform the various functions of the payload modules and implement a wide range of operational missions by simply interchanging payload modules.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a vertical takeoff and landing flight mode and a forward flight mode, the aircraft comprising:
    an airframe including at least one wing;
    first and second oppositely disposed booms extending longitudinally from the at least one wing, the first and second booms each having forward and aft ends;
    first and second forward rotors respectively coupled to the forward ends of the first and second booms, the first and second forward rotors reversibly tiltable between a vertical lift orientation, wherein the first and second forward rotors are above the respective first and second booms, and a forward thrust orientation, wherein the first and second forward rotors are forward of the respective first and second booms; and
    first and second aft rotors respectively coupled to the aft ends of the first and second booms, the first and second aft rotors reversibly tiltable between a vertical lift orientation, wherein the first and second aft rotors are below the respective first and second booms, and a forward thrust orientation, wherein the first and second aft rotors are aft of the respective first and second booms.

2. The tiltrotor aircraft as recited in claim 1 further comprising a flight control system operably associated with the forward rotors and the aft rotors, the flight control system operable to independently control each of the rotors including transitions between the vertical lift and the forward thrust orientations.

3. The tiltrotor aircraft as recited in claim 2 wherein the flight control system commands operation of the rotors responsive to at least one of remote flight control, autonomous flight control and combinations thereof.

4. The tiltrotor aircraft as recited in claim 1 wherein the forward rotors are counter rotated and wherein the aft rotors are counter rotated to control yaw in the vertical takeoff and landing flight mode.

5. The tiltrotor aircraft as recited in claim 1 wherein the forward and aft rotors of the first boom are counter rotated and wherein the forward and aft rotors of the second boom are counter rotated to control yaw in the vertical takeoff and landing flight mode.

6. The tiltrotor aircraft as recited in claim 1 wherein the forward and aft rotors are configured for pitch control responsive to differential thrust output of the forward rotors relative to the aft rotors in the vertical takeoff and landing flight mode.

7. The tiltrotor aircraft as recited in claim 1 wherein the forward and aft rotors are configured for roll control responsive to differential thrust output of the forward and aft rotors of the first boom relative to the forward and aft rotors of the second boom in the vertical takeoff and landing flight mode.

8. The tiltrotor aircraft as recited in claim 1 wherein the forward and aft rotors further comprise fixed pitch rotor blades and wherein the forward and aft rotors are configured to change thrust output responsive to changing rotational speed.

9. The tiltrotor aircraft as recited in claim 1 wherein the forward and aft rotors further comprise variable pitch rotor blades and wherein the forward and aft rotors are configured to change thrust output responsive to changing rotor blade pitch.

10. The tiltrotor aircraft as recited in claim 1 further comprising first and second tail assemblies respectively coupled to the aft ends of the first and second booms, the first and second tail assemblies operating in an upwash in the forward flight mode.

11. The tiltrotor aircraft as recited in claim 1 further comprising a power system including at least one electric motor operably associated with each of the rotors and an electric energy source.

12. The tiltrotor aircraft as recited in claim 1 wherein the forward rotors further comprise folding rotor blades configured to reduce drag in the forward flight mode.

13. A tiltrotor aircraft having a vertical takeoff and landing flight mode and a forward flight mode, the aircraft comprising:
 a fuselage;
 at least one wing extending laterally from the fuselage;
 first and second booms extending longitudinally from the at least one wing on opposite sides of the fuselage, the first and second booms each having forward and aft ends;
 first and second forward rotors respectively coupled to the forward ends of the first and second booms, the first and second forward rotors reversibly tiltable between a vertical lift orientation, wherein the first and second forward rotors are above the respective first and second booms, and a forward thrust orientation, wherein the first and second forward rotors are forward of the respective first and second booms; and
 first and second aft rotors respectively coupled to the aft ends of the first and second booms, the first and second aft rotors reversibly tiltable between a vertical lift orientation, wherein the first and second aft rotors are below the respective first and second booms, and a forward thrust orientation, wherein the first and second aft rotors are aft of the respective first and second booms.

14. The tiltrotor aircraft as recited in claim 13 wherein the flight control system commands operation of the rotors responsive to at least one of remote flight control, autonomous flight control and combinations thereof.

15. The tiltrotor aircraft as recited in claim 13 wherein the forward rotors are counter rotated and wherein the aft rotors are counter rotated to control yaw in the vertical takeoff and landing flight mode.

16. The tiltrotor aircraft as recited in claim 13 wherein the forward and aft rotors of the first boom are counter rotated and wherein the forward and aft rotors of the second boom are counter rotated to control yaw in the vertical takeoff and landing flight mode.

17. The tiltrotor aircraft as recited in claim 13 wherein the forward and aft rotors are configured for pitch control responsive to differential thrust output of the forward rotors relative to the aft rotors in the vertical takeoff and landing flight mode.

18. The tiltrotor aircraft as recited in claim 13 wherein the forward and aft rotors are configured for roll control responsive to differential thrust output of the forward and aft rotors of the first boom relative to the forward and aft rotors of the second boom in the vertical takeoff and landing flight mode.

19. The tiltrotor aircraft as recited in claim 13 further comprising first and second tail assemblies respectively coupled to the aft ends of the first and second booms, the first and second tail assemblies operating in an upwash in the forward flight mode.

20. The tiltrotor aircraft as recited in claim 13 wherein the forward rotors further comprise folding rotor blades operable to reduce drag in the forward flight mode and wherein the aft rotors further comprise fixed pitch rotor blades.

\* \* \* \* \*